(12) United States Patent
Lex

(10) Patent No.: US 10,439,235 B2
(45) Date of Patent: Oct. 8, 2019

(54) PROCESS FOR JOINING INCOMPATIBLE MATERIALS AND MATERIALS FORMED THEREBY

(71) Applicant: EnSync, Inc., Menomonee Falls, WI (US)

(72) Inventor: Peter Lex, Menomonee Falls, WI (US)

(73) Assignee: Faith Technologies, Inc., Menasha, WI (US)

( * ) Notice: Subject to any disclaimer, the term of this patent is extended or adjusted under 35 U.S.C. 154(b) by 243 days.

(21) Appl. No.: 15/416,654

(22) Filed: Jan. 26, 2017

(65) Prior Publication Data

US 2017/0214064 A1    Jul. 27, 2017

Related U.S. Application Data

(60) Provisional application No. 62/287,525, filed on Jan. 27, 2016.

(51) Int. Cl.
*H01M 4/36* (2006.01)
*H01M 8/0273* (2016.01)
(Continued)

(52) U.S. Cl.
CPC ........... *H01M 8/0273* (2013.01); *B29C 69/00* (2013.01); *H01M 8/1023* (2013.01); *H01M 8/1027* (2013.01); *H01M 8/1032* (2013.01); *H01M 8/1039* (2013.01); *H01M 8/1051* (2013.01); *H01M 8/1053* (2013.01); *H01M 8/1069* (2013.01); *H01M 8/188* (2013.01); *H01M 12/085* (2013.01); *B29C 65/02* (2013.01); *B29C 65/06* (2013.01); *B29C 65/08* (2013.01); *B29C 65/8223* (2013.01); *B29C 66/1122* (2013.01); *B29C 66/24244* (2013.01); *B29C 66/30326* (2013.01); *B29C 66/43* (2013.01); *B29C 66/712* (2013.01); *B29C 66/727* (2013.01); *B29C 66/7392* (2013.01); *B29C 66/929* (2013.01);
(Continued)

(58) Field of Classification Search
CPC ............. H01M 8/0273; H01M 8/1023; H01M 8/1027; H01M 8/1032; H01M 8/1039; H01M 8/1051; H01M 8/1053; H01M 8/1069; H01M 8/188; H01M 8/0282; H01M 8/0284; H01M 12/085; H01M 2008/1095; H01M 2300/0082
See application file for complete search history.

(56) References Cited

U.S. PATENT DOCUMENTS

| 5,626,986 A * | 5/1997 | Jahns ..................... H01M 4/663 423/445 R |
| 2014/0162096 A1* | 6/2014 | Lex .......................... H01M 2/38 429/81 |

(Continued)

*Primary Examiner* — Jane J Rhee
(74) *Attorney, Agent, or Firm* — Boyle Fredrickson, SC

(57) ABSTRACT

A method for joining incompatible materials is provided that includes the steps of welding a first component formed of a thermoplastic material and a second component of a porous material to one another to form a subassembly and optionally molding a third component around the subassembly. The method enables the incompatible first component and the third component to be joined to one another, such as to form an electrolyte battery flow frame around an ion exchange material and/or microporous separator material in order to form a separator for an electrolyte flow battery.

16 Claims, 5 Drawing Sheets

(51) Int. Cl.
*H01M 8/1027* (2016.01)
*H01M 8/1032* (2016.01)
*H01M 8/1039* (2016.01)
*H01M 8/18* (2006.01)
*B29C 69/00* (2006.01)
*H01M 8/1053* (2016.01)
*H01M 8/1069* (2016.01)
*H01M 12/08* (2006.01)
*H01M 8/1023* (2016.01)
*H01M 8/1051* (2016.01)
*H01M 8/1018* (2016.01)
*B29L 31/34* (2006.01)
*B29C 65/08* (2006.01)
*B29C 65/82* (2006.01)
*B29C 65/00* (2006.01)
*B29C 65/02* (2006.01)
*B29C 65/06* (2006.01)
*H01M 8/0282* (2016.01)
*H01M 8/0284* (2016.01)

(52) U.S. Cl.
CPC ........ *B29C 66/949* (2013.01); *B29C 66/9513* (2013.01); *B29C 66/9517* (2013.01); *B29L 2031/3468* (2013.01); *H01M 8/0282* (2013.01); *H01M 8/0284* (2013.01); *H01M 2008/1095* (2013.01); *H01M 2300/0082* (2013.01)

(56) References Cited

U.S. PATENT DOCUMENTS

2014/0227629 A1* 8/2014 Coad .................. H01M 12/085
　　　　　　　　　　　　　　　　　　　　　429/514
2015/0072261 A1* 3/2015 Mench ................. H01M 8/188
　　　　　　　　　　　　　　　　　　　　　429/452

* cited by examiner

PROCESS FOR JOINING INCOMPATIBLE MATERIALS AND MATERIALS FORMED THEREBY

CROSS-REFERENCE TO RELATED APPLICATIONS

This application claims priority from U.S. Provisional Patent Application Ser. No. 62/287,525, filed on Jan. 27, 2016, the entirety of which is expressly incorporated herein by reference for all purposes.

FIELD OF THE INVENTION

The present invention relates generally to molding processes, and more specifically to a molding process capable of joining materials that are normally not able to be joined to one another in molding methods.

BACKGROUND OF THE INVENTION

There are many different methods currently in use to join materials to one another. With regard to thermoplastic materials, the materials are often joined to one another through the use of forces applied to the thermoplastic material that heat and consequently soften the thermoplastic materials due the properties of the material, enabling the components to be joined to one another.

In one example of a method or process of this type, vibrational/friction welding of plastic components is often utilized as a standard industrial process for joining thermoplastic materials. In frictional/vibrational welding, one component to be welded is vibrated against a static or stationary component, through which or as a force is applied against the components. The resulting friction created between the vibrating component and the stationary component in the friction welding process causes localized melting of the plastic from both components due to absorption of vibration energy, which is introduced across the joint to be welded. The melted areas of the components are continually pressed against one another during the vibration and can then join with one another, thereby forming the weld between the components.

The friction/vibration welding process works well for thermoplastic materials with the same or a similar chemical make-up by enabling the melded or melted areas of the components to form a chemical bond at the interface between the two materials.

However, the frictional welding process will not work with components formed of materials having overly dissimilar chemical make-ups/formulas, because they will not form a chemical bond at the interface of the melted portions of each component.

Thus, it is desirable to develop a frictional and/or vibrational welding method/process that can be utilized on components formed of materials that are chemically dissimilar from one another to form a weld between the components. The components can then be utilized in a number of different products, including improved separators for electrolyte flow batteries.

SUMMARY OF THE INVENTION

Briefly described, according to an exemplary embodiment of the invention, a method of joining components, such as thermoplastic components, having a dissimilar chemical composition is provided. In the method, one of the components is selected to be porous, in which a "porous material" is hereby defined as a material that has small or minute holes in the material that allow liquid and/or air to pass through. In particular, when friction or vibrationally welding a thermoplastic material of one chemical composition with a porous material, which can be a thermoplastic material of another chemical composition, the frictional energy causes the thermoplastic component to melt and flow into the holes in the porous component, such as into the openings (macro) and/or interstices between the molecules forming the porous component (micro). This enables the thermoplastic components to form a hermitic seal between the two components and allows this combination to be used as a subassembly in a separate process such as an insert molding or other suitable process to join an incompatible material to the subassembly.

According to another aspect of another exemplary embodiment of the invention, the method can be utilized to join chemically dissimilar materials to form a separator for an electrolyte flow battery, which cannot be directly joined to one another due to being formed from incompatible materials.

Numerous other aspects, features, and advantages of the invention will be made apparent from the following detailed description together with the drawing figures.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
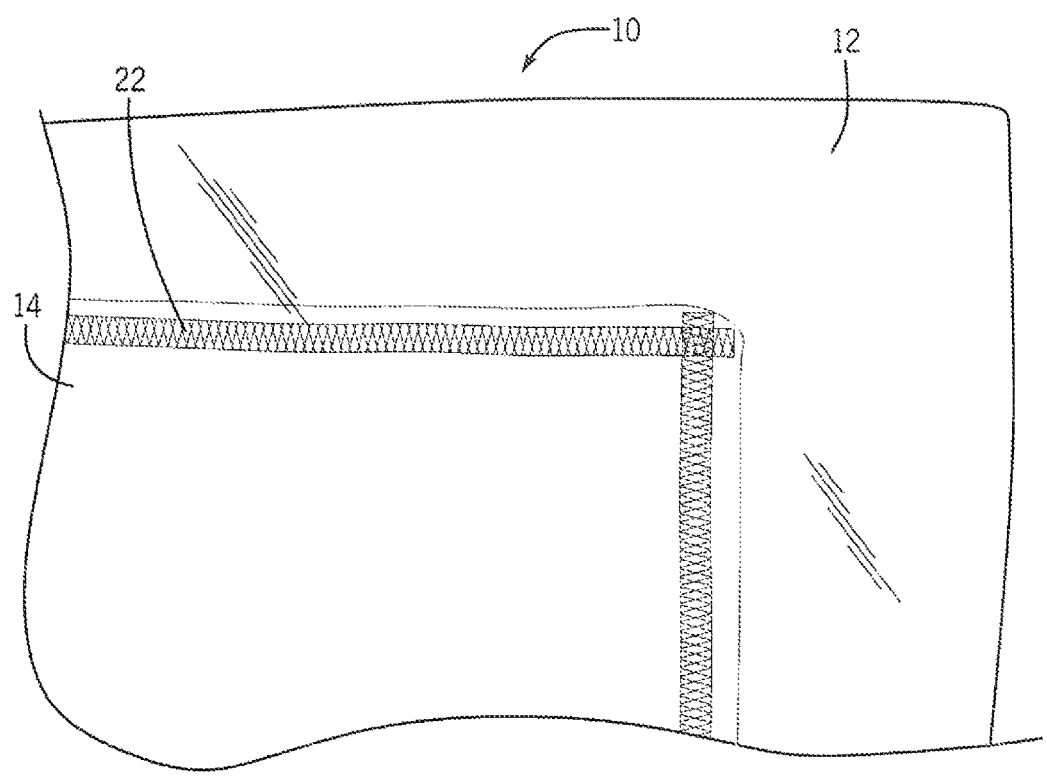
FIG. 1 is a front perspective view of a pair of dissimilar materials joined utilizing a method according to an exemplary embodiment of the invention.

Referring now in detail to the drawing figures, wherein like reference numerals represent like parts throughout the several views one exemplary embodiment a method is provided for welding dissimilar materials to one another to form a mechanical and/or hermetic seal there between. The method provides the ability to weld the dissimilar materials to one another in order to form a mechanical and/or hermetic bond between the components being welded together, such as to enable the formation of a separator in a flow frame for use within an electrolyte flow battery.

The method involves the choice of a suitable welding process that provides sufficient energy in the form of friction and/or vibration to the components to be welded to form a mechanical bond between the components. The method also involves the selection of the components to be welded to include a thermoplastic material and a porous material, which can optionally be a thermoplastic material, a thermoset resin, a porous carbon material or a ceramic, among other suitable solid porous material. The vibrational energy transferred to the thermoplastic material in the selected welding process enables the thermoplastic material to melt and flow into the porous material, where the thermoplastic material is allowed to cool within the holes in the porous material, thereby forming a mechanical bond between the components.

With reference to FIG. 1, in one exemplary embodiment of the invention an ultrasonic welding method is utilized to form a welded subassembly 10 of a non-porous thermoplastic component 12 with a porous component 14. In the illustrated exemplary embodiment, the component 12 is a thermoplastic material film, such as a non-porous material, which is a material devoid of holes, that includes, but is not limited to acrylics, acrylonitrile-butadiene-styrene (ABS), polycarbonate, polyethylene, polypropylene, polyvinyl chloride, polyvinylidene fluoride, polytetrafluoroethylene and sulfonated tetrafluoroethylene polymers, as well as mixtures thereof, among others. However, in alternative exemplary embodiments, the material 12 can be a porous material similar to material 14, as long as one of the components 12 and 14 is formed of a thermoplastic material.

In the illustrated exemplary embodiment, the component 14 is a porous film 14 that includes but is not limited to polyethylene, polypropylene, polyvinylidene fluoride, polytetrafluoroethylene, and polyvinyl chloride with the term porous defined as a porous film or material with very small holes that allow fluid and/or air to pass into and/or through the material. Porous materials for this invention would generally have an average pore size of less than 1 micron and a porosity in the range of 20-80% (more common would be a porosity between 50-70%) where the percentage of porosity is the percentage of empty space within the material 14. Further, it is also contemplated within the scope of the invention that the films forming the components 12,14 can have varying thicknesses, and that, as opposed to films, the components 12,14 can be funned of different structures other than films, such as sheets, bars, rods and tubes, among others.

To join the component 12 and component 14 to form the subassembly 10 using the method, initially the component 12 and component 14 are placed and held in contact with one another in a known manner. Once properly positioned, the components 12,14 are subjected to an amount of vibrational energy via a suitable device, such as a Branson 2000X ultrasonic welding system. The components 12,14 are held and pressed into contact with each other as the vibrational energy is applied thereto, e.g., to move or oscillate the component 12 relative to the component 14. This enables the friction/vibrational energy generated by the relative motion of the components 12,14 to one another to heat/soften melt the thermoplastic material forming component 12 which can then flow into the spaces (not shown) present in the material forming the component 14. While any suitable parameters for the method can be utilized, in one exemplary embodiment, the parameters of the welding method are 2.0 kHz frequency, 50 micron amplitude, 200 pound force and a 3 second weld time. These parameters can also be varied as necessary, such as between 10 kHz-40 kHz frequency, 10-500 micron amplitude, 10-1000 lb force and 2-10 second weld time.

In this method, by allowing the thermoplastic material of component 12 to form a mechanical bond/bonded area 22 with the porous material of component 14, this creates a permanent mechanical structure (not shown) between the component 12 and the component 14. Once the subassembly 10 is formed, the subassembly can be positioned within another molding process, such as an injection or insert molding process.

Figure 2:
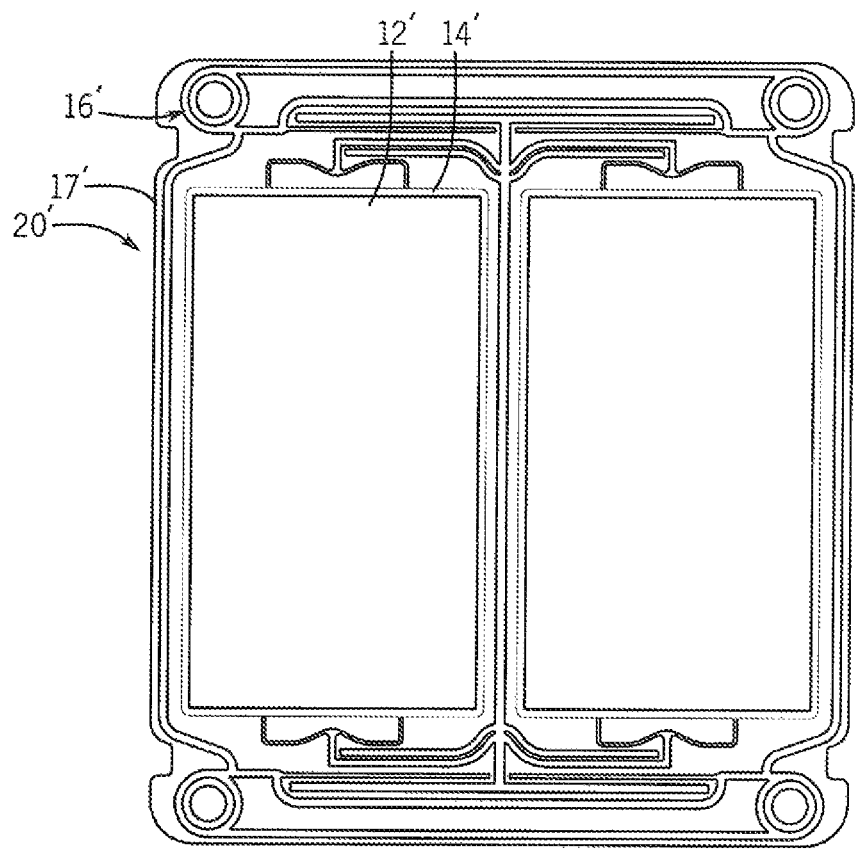
FIG. 2 is a front perspective view of one exemplary embodiment of a welded subassembly structure formed into a electrolyte flow battery flow frame constructed according to the method of the invention.
Figure 3:
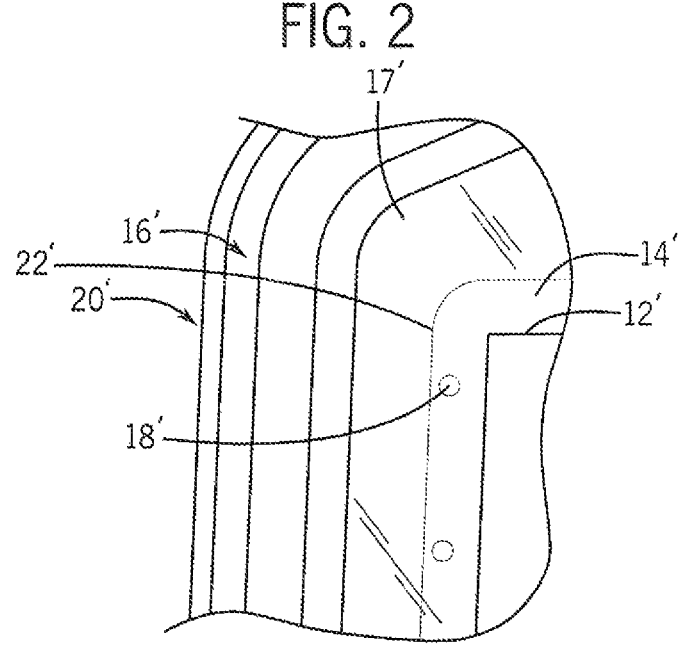
FIG. 3 is a partially broken away perspective view of the welded subassembly structure and flow frame of FIG. 2.

Referring now to FIGS. 2 and 3, in another exemplary embodiment of the invention, a first component 12' such as an ion exchange membrane (0.005-0.02 mm thick) formed from perfluorosulfonic acid (PFSA Ionomer) is ultrasonically/frictionally/vibrationally bonded to a second component 14' formed from a standard microporous battery separator material, such as is a silica filled microporous sheet material, to form a mechanical bond between the two incompatible materials and thereby create a subassembly 10'. In the exemplary embodiment illustrated in FIGS. 2 and 3, the bond is formed around the perimeter of the components 12' and 14', though any other suitable configuration for the bond can also be formed. The formation of the subassembly 10' can then be followed by insert molding the subassembly 10' into a final component 20', such as an electrolyte battery flow frame 16'.

In the illustrated exemplary embodiment of FIG. 2, once formed, the subassembly 10' is insert molded with third component 16' such as a flow frame material 17', which can be any suitable material such as glass filled polypropylene. The third component/flow frame 16' is molded around the perimeter 18' of the subassembly 10' which allows a mechanical bond between the two materials forming the first component 12' and the third component 16', which cannot be joined directly due to their chemical incompatibility.

Initial tests have demonstrated the feasibility of welding the ion exchange membrane 12' to the microporous separator material 14' using a Branson 2000X ultrasonic welding system (not shown). After welding, the subassembly 10' formed was subjected to a peel test in which it was determined that bonded area 22,22' (FIG. 1) was stronger than the individual materials 12',14' by themselves, i.e., the material failed before the weld/bonded area 22'.

Figure 4:
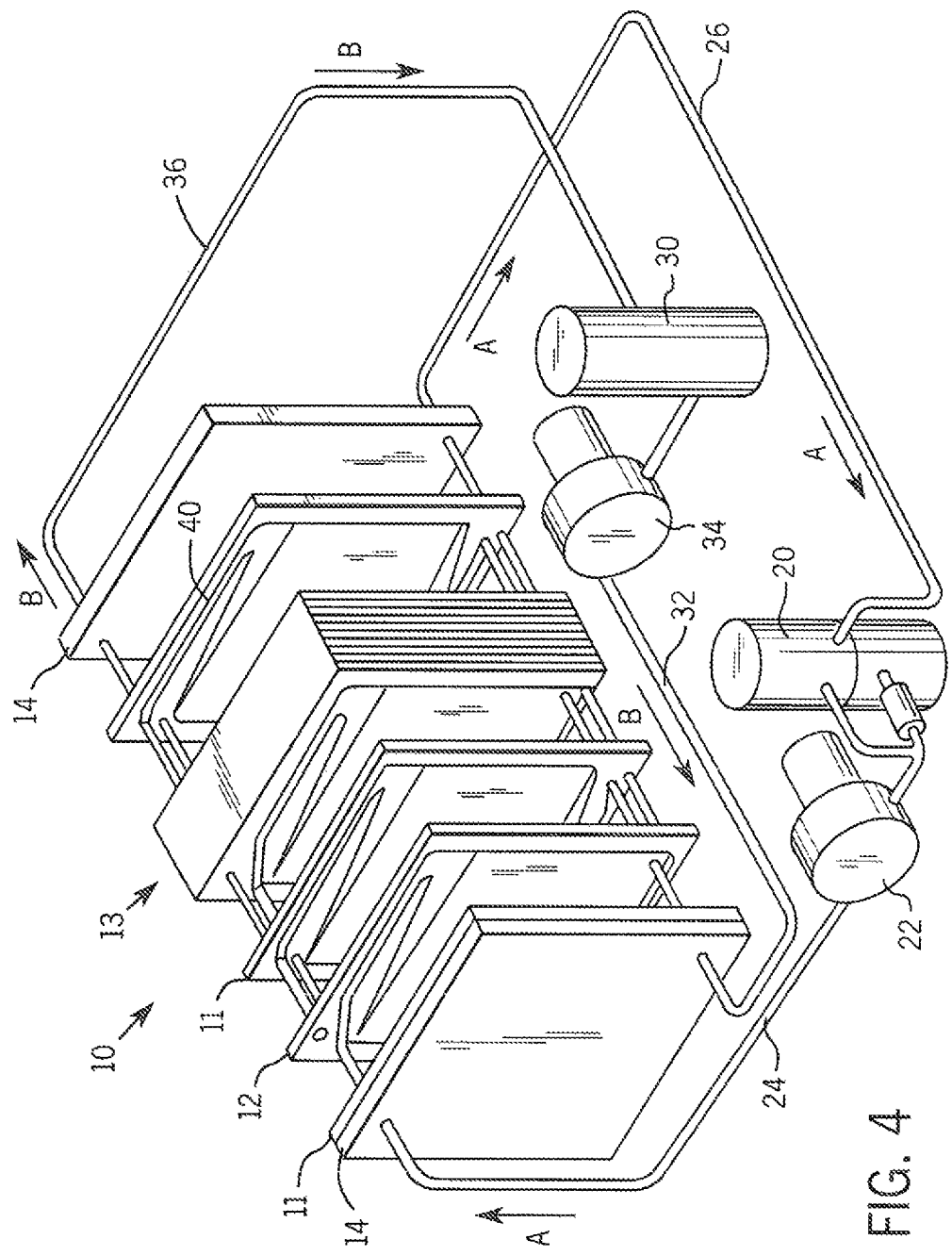
FIG. 4 is a schematic diagram of a stack of alternatively disposed zinc-bromine battery components, cooperating with electrolyte reservoirs according to an exemplary embodiment of the invention.

In one particular exemplary embodiment, the final component 20' formed to include the subassembly 10' and the flow frame 16' is utilized as a separator 120 of an electrolyte flow battery including zinc complexes, as are known in the art, such as U.S. Pat. Nos. 4,049,886; 5,002,841; 5,188,915 and 5,650,239, and US Patent Application Publication No. 2012/0326672, each of which is expressly incorporated by reference herein for all purposes in its entirety, and which each disclose a zinc-bromine battery, is shown in an exploded view and is designated generally by the numeral 100 in FIG. 4. The zinc-bromine battery 100 includes a series of electrodes 110 and separators 120, welded together to form a stack 130 of electrochemical cells. Each battery 100 includes a predetermined number of electrodes 110 and separators 120 and, thus, a predetermined number of electrochemical cells. As best seen in FIG. 2, respective endblocks 140 are disposed at each end of the battery 100. The endblocks 140 each have a pair of openings 150 in which a pair of terminal studs 160 are positioned. The terminal studs 160 are electrically coupled to the battery's terminal electrodes 170 which may be mounted directly adjacent to the endblocks. The terminal studs provide a convenient means through which current may enter and leave the battery. Each terminal electrode is a current collector means capable of collecting current from, and distributing current to, the electrochemical cells of the battery. Although not shown, it should be understood that terminal, electrodes are mounted on, or are adjacent to, each end block.

Referring back to FIG. 4, aqueous, or optionally non-aqueous, catholyte is stored in a catholyte reservoir 200. A catholyte pump 220 pumps aqueous catholyte through a common catholyte, manifold 240 into each cathodic half-cell as indicated by the arrows labeled A in FIG. 4, and back to the catholyte reservoir 200 through a catholyte return manifold 260.

Similarly, aqueous, or optionally non-aqueous, anolyte is stored in an anolyte reservoir 30 and pumped through an anolyte inlet manifold 320 by an anolyte pump 340. The anolyte flows through, each anodic half-cell, one of which is disposed between each cathodic half-cell, and back to the anolyte reservoir 300 through an anolyte return manifold 360, as indicated by the arrows labeled B in FIG. 4. Thus, the electrochemical cells of the battery 100 are coupled in fluid flowing relation to the reservoirs 200 and 300 through the manifolds 240, 260, 320, and 360.

Figure 5:
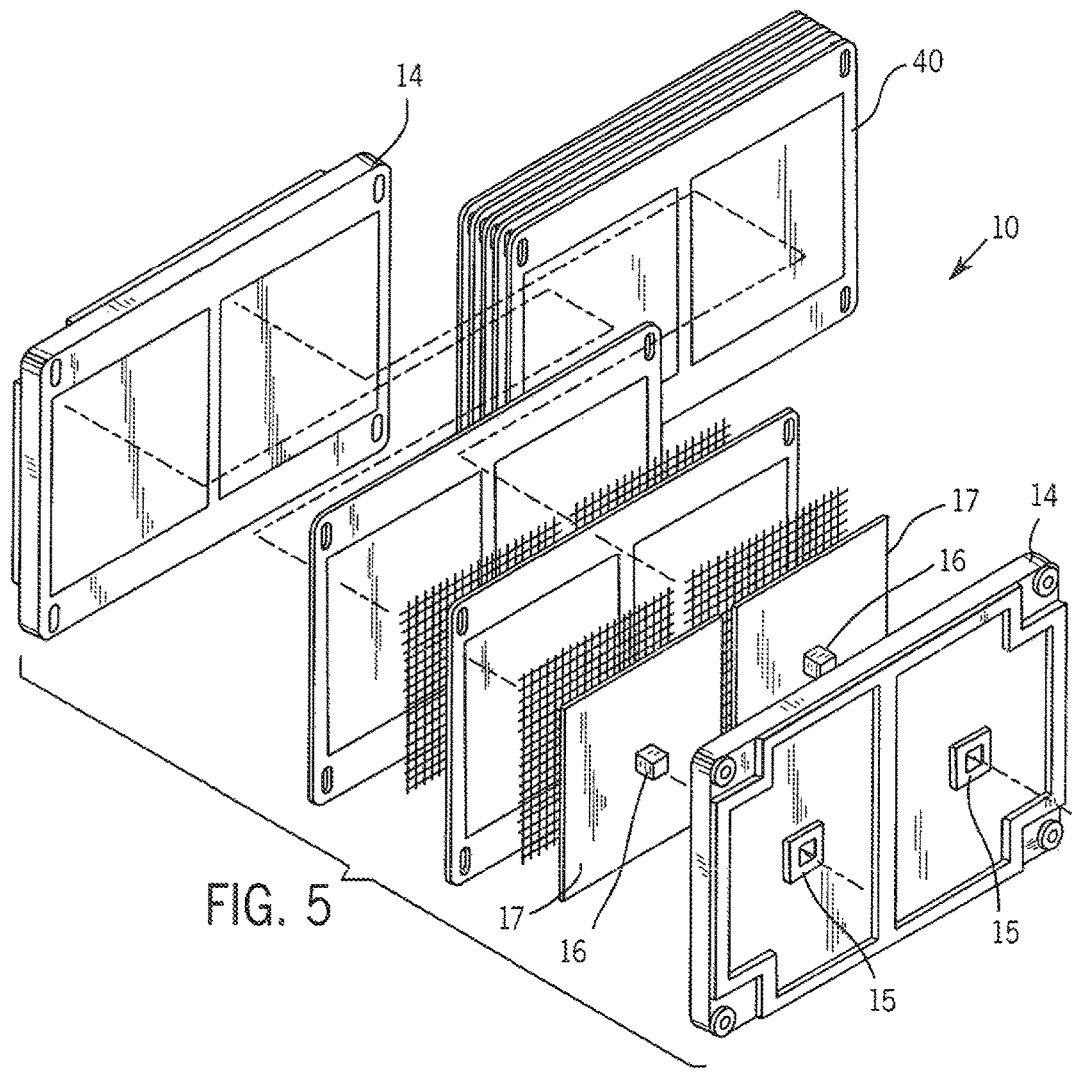
FIG. 5 is a perspective, exploded view of a stack of alternately disposed zinc-bromine battery components according to an exemplary embodiment of the invention.

As shown in FIG. 5, each electrode and separator 120 formed of the subassembly 10' is individually mounted in a nonconductive flow frame 400. Preferably, the nonconductive flow frame 400 is made from a polymeric material such as polyethylene. Long, winding electrolyte inlet and outlet channel patterns are incorporated into one or both sides of the separator frame, the electrode frame, or both. The geometry of the channels, contributes to the electrical resistance required to reduce shunt currents which result in cell power losses. A leak-free internal seal is maintained along the channels and about the common perimeter of adjacent separators and electrodes.

Figure 6:
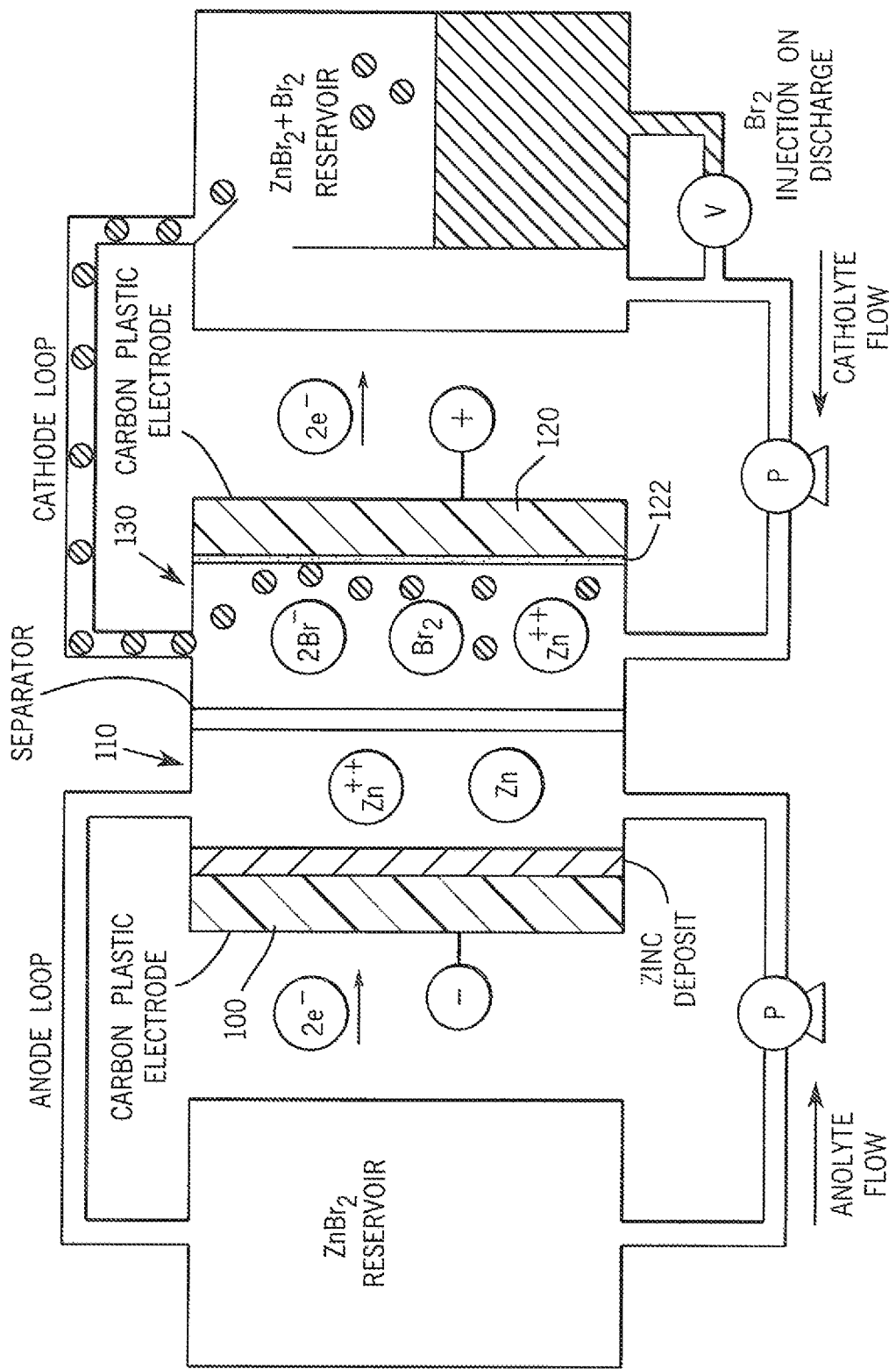
FIG. 6 is a schematic diagram of a zinc-bromine battery cell, showing electrolyte flow to and from the reservoirs and through the battery according to an exemplary embodiment of the invention.

As can be more readily seen by reference to the schematic representation of FIG. 6, during charge electron flow through the battery 10 results in zinc being plated on an anode or zinc electrode 1000 which is in an anodic half-cell 1100. During the same time bromine is evolved at a cathode or bromine electrode 1200 which is in a cathodic half-cell 1300. When the bromine is evolved it is immediately complexed with a quaternary salt and is removed from the battery to the catholyte reservoir 300. The complexed bromine or dense second phase is separated by gravity from bromine in the reservoir. Normally, on discharge, the complexed bromine or second phase is returned to the battery stack were bromine is reduced to bromide ion and zinc metal is oxidized to zinc ion.

Various other embodiments of the invention are contemplated as being within the scope of the filed claims particularly pointing out and distinctly claiming the subject matter regarded as the invention.

The invention claimed is:

1. A method for bonding dissimilar materials, the method comprising the steps of:
    a) molding a first component formed of a thermoplastic material and a second component of a porous material that is incompatible with the first component to one another to form a subassembly; and
    b) molding a third component around the subassembly in exclusive contact with the second component, wherein the third component is compatible with the second component but incompatible with the first component,
    wherein the first component is an ion exchange membrane,
    wherein the second component is a microporous battery separator material, and
    wherein the third component is an electrolyte flow battery flow frame material.

2. The method of claim 1 wherein the step of welding the first component and the second component to one another comprises ultrasonically welding the first component to the second component.

3. The method of claim 1 wherein the step of molding the third component to the subassembly comprises insert molding the third component to the subassembly.

4. The method of claim 1 wherein the ion exchange membrane is formed of a perfluorosulfonic acid ionomer.

5. The method of claim 1 wherein the microporous battery separator material is a silica filled microporous sheet material.

6. The method of claim 1 wherein the electrolyte flow battery flow frame material is glass filled polypropylene.

7. The method of claim 1 wherein the step of molding the first component to the second component comprises ultrasonically welding the first component and the second component to one another.

8. The method of claim 1 wherein the step of molding the first component to the second component comprises frictionally welding the first component and the second component to one another.

9. The method of claim 1 wherein the step of molding the subassembly to the third component comprises insert molding the third component around the subassembly.

10. A separator for an electrolyte flow battery formed by the method of claim 1.

11. The separator of claim 7 wherein the first component is an ion exchange membrane, wherein the second component is a microporous battery separator material and wherein the third component is an electrolyte flow battery flow frame material.

12. A separator or ion exchange membrane for use in an electrolyte flow battery, the separator comprising:
    a) a first component formed of thermoplastic material, wherein the first component is an ion exchange membrane;
    b) a second component formed of a porous material, wherein the second component is formed of a microporous battery separator material that is incompatible with the first component; and
    c) a mechanical bond formed between the first component and the second component.

13. The separator of claim 12 wherein the mechanical bond is formed by ultrasonically welding the first component to the second component.

14. The separator of claim 12 wherein the mechanical bond is formed by frictionally welding the first component to the second component.

15. The separator of claim 12 further comprising a third component molded to the at least one of the first component or the second component.

16. The separator of claim 15 wherein the third component is an electrolyte flow battery flow frame material.

* * * * *